(12) United States Patent
Koga

(10) Patent No.: US 6,684,200 B1
(45) Date of Patent: Jan. 27, 2004

(54) CASHLESS VENDING MACHINE

(75) Inventor: Takahiro Koga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/448,429

(22) Filed: Nov. 24, 1999

(30) Foreign Application Priority Data

Nov. 27, 1998 (JP) ............................................ 10-338234

(51) Int. Cl.$^7$ .............................................. G06F 17/60
(52) U.S. Cl. ............................. 705/71; 705/16; 705/17; 705/18; 705/65; 705/72
(58) Field of Search .............................. 705/16, 17, 18, 705/65, 72

(56) References Cited

U.S. PATENT DOCUMENTS 5,193,114 A * 3/1993 Moseley ...................... 713/183

FOREIGN PATENT DOCUMENTS

| JP | 8-87655 | | 4/1996 | |
| JP | 08249530 | * | 9/1996 | ............. G06F/9/00 |
| JP | 9-182161 | | 7/1997 | |
| JP | 9-212725 | | 8/1997 | |

OTHER PUBLICATIONS

DeCloet, Derek. "Plugged In." Canadian Business, 72, 11, 187 (2). Jun. 25, 1999. DIALOG.*
Golden, "reach out and pay someone now", Mar. 21, 1999, Sunday Business Post, 2 pages.*
DeCloet "Plugged in. (technological advances)", Jun. 25, 1999, Canadian Business, 72, 11, 187(2), 3pages.*

* cited by examiner

Primary Examiner—John W. Hayes
Assistant Examiner—James A. Reagan
(74) Attorney, Agent, or Firm—Foley & Lardner

(57) ABSTRACT

The cashless vending machine system of the present invention comprises: a radio-communication terminal having a terminal information storage device for storing a verification key, and a terminal encryption processor for performing encryption with a random number and the terminal verification key; a vending machine having a radio-communication terminal pseudo network forming a pseudo network for the radio-communication terminal, and a verification key storage area for storing the terminal verification key from the radio-communication terminal, the radio-communication terminal pseudo network having a decryption processor for decrypting the terminal verification key from a value produced by the terminal encryption processor and a random number produced by a random number generator; and a center for communicating with the vending machine by radio or cable communication.

3 Claims, 5 Drawing Sheets

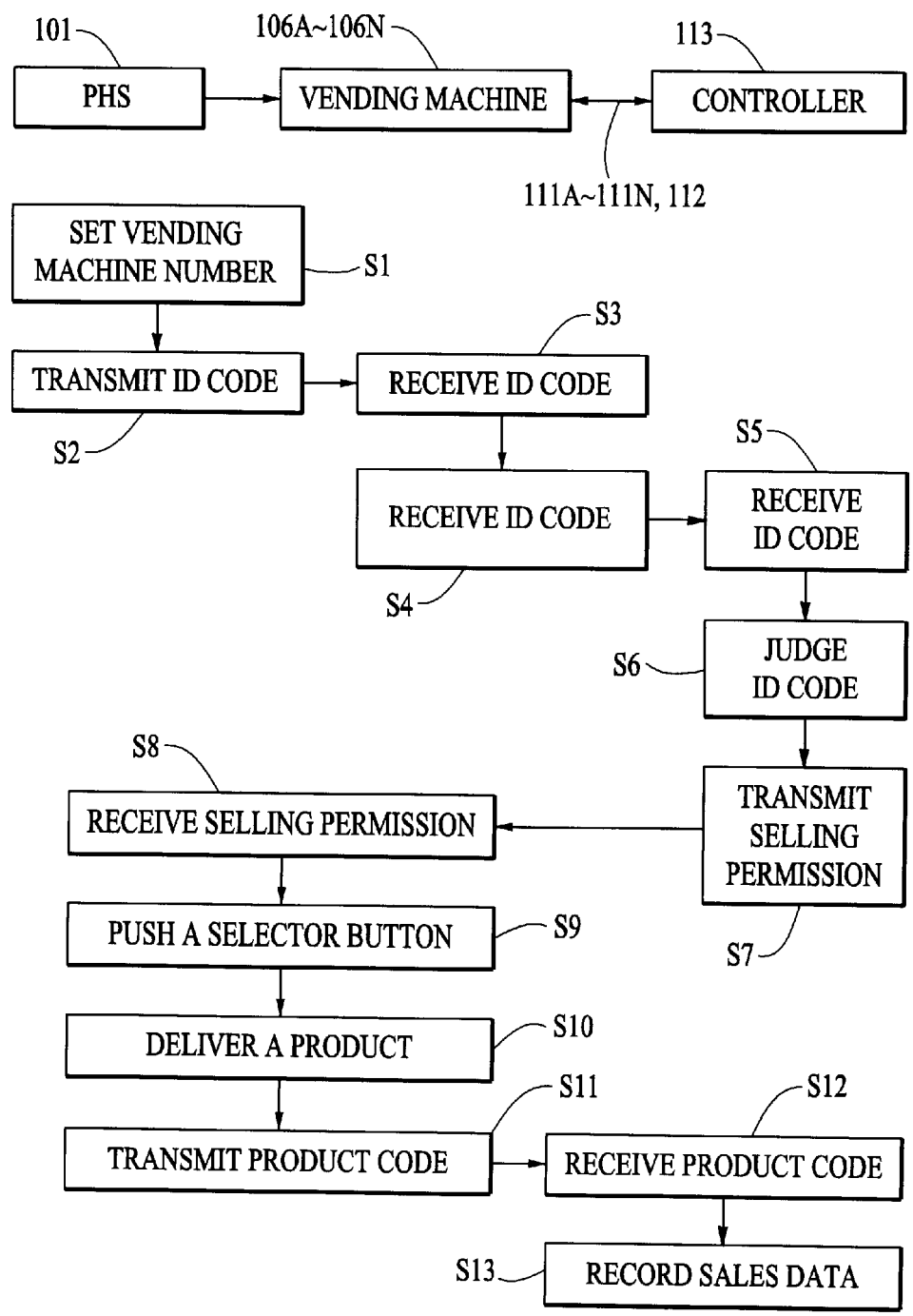

CASHLESS VENDING MACHINE

BACKGROUND OF THE INVENTION

1. Field of the Invention

The present invention relates to a cashless vending machine system using a portable terminal.

This application is based on Japanese Patent Application No. Hei 10-338234, the contents of which are incorporated herein by reference.

2. Description of the Related Art

FIG. 4 is a block diagram showing a conventional vending machine system, which allows deferred payment, using a portable telephone terminal, and FIG. 5 is a flowchart showing its operation.

As shown in FIG. 4, the vending machine system comprises a PHS terminal 101 which is a portable telephone terminal, a number of vending machines 106A, 106B, . . . 106N, and a controller 113. The personal handyphone system (PHS) terminal 101 comprises an input device 102 such as a keyboard for inputting a code number, a memory 104 for storing the input information to be transmitted, a controller 103 for controlling the entire operation of the PHS 101, and a transmitter 105 for converting the information into a radio wave signal and sending it. The transmitted information includes a personal identification code for identifying a user (which is a person, or a company) and a vending machine addressing code for addressing a vending machine. The personal identification code is, e.g., a telephone number assigned to the portable telephone terminal, or a number or code which can be distinguished from those of the other persons.

The vending machine 106A comprises a communication interface 107 for interface with the PHS 101, a controller 108 with a microprocessor for controlling the entire operation of the vending machine 106A and performing signal processing, a communication I/O device for on-line interface between the vending machine controller 108 and the controller 113, and a product delivery device 109 for delivering a product under the control of the memory 104. Other vending machines 106B, . . . , 106N have the same structure as the vending machine 106A.

These vending machines 106A to 106N are connected to the controller 113 through the on-line network via local buses 111A to 111N and a communication data bus 112. The controllers 108 and 113 control the vending machine 106A according to the control algorithm described later (see FIG. 5). The controller 113 includes a micro processor and a memory, and transmits data between the vending machines 106A to 106N through the communication data bus 112 and the local buses 111A to 111N while referring to internal ROM and RAM (not shown), to thereby control the entire operations.

The control operation will be explained with reference to FIG. 5. Initially, a user sets the vending machine number through the input device 102 of the PHS 101 (step S1). The controller 103 reads the ID code from the memory 104, and transmits the ID code and the vending machine number to the transmitter 105. The transmitter 105 converts the ID code and the vending machine number into the carrier signal, and transmits it to the vending machines 106A to 106N by radio communication (step S2). The vending machines 106A to 106N receive the ID code and the vending machine number (step S3), and send them to the vending machine controller 113 through the communication interface 110, the local buses 111A to 111N, and the communication data bus 112 (step S4).

The controller 113 receives the ID code (step S5), and judges the received ID code (step S6). The judgement of the ID code includes a security check of whether the use of the ID is prohibited or not. When there is no problem in the judgement, the controller 113 sends a selling permission signal to the vending machine controller 108 through the communication data bus 112, the local buses 111A to 111N, and the communication interface 110 (step S7).

The vending machine controller 108 receives the selling permission signal (step S8), and turns on the price indicator for a product section to permit selling of the product. Then, the user pushes a product selector button (step S9). The vending machine controller 108 extracts the selected product from a product rack in the vending machine, and delivers the product through the product delivery unit 109 (step S10). The vending machine controller 108 transmits the product code to the controller 113 (step S11). The controller 113 receives the product code (step S12), and collects and records the sales data of the vending machine 106A to 106N to send a bill to the user later (step S13).

According to the conventional technique, the vending machine, which is designated by the portable telephone terminal such as a PHS, communicates with the controller by the data communication, and sells the product to the user who is identified by the ID code of the telephone terminal. This technique eliminates use of an ID card, and allows deferred payment. However, the user must initially input the vending machine number through the PHS, which is more troublesome than using an ID card.

In general, PHS terminals do not perform the operations of reading the ID code from the memory by the controller, transmitting the ID code and the vending machine number to the transmitter, converting the ID code and the vending machine number into the carrier signal, and transmitting it by radio communication. Disadvantageously, the conventional technique requires a special PHS different from a general PHS.

BRIEF SUMMARY OF THE INVENTION

It is therefore an object of the present invention to provide a vending machine system which uses an existing portable radio-communication terminal such as a PHS, eliminates troublesome operations, does not require a dedicated terminal and a cash card, and allows deferred payment, reduces the costs and improves the reliability by using the PHS which originally employs improved cryptographic security.

In order to accomplish the above object, the cashless vending machine system comprises: a plurality of radio-communication terminals with terminal verification keys assigned in a one to one correspondence to the terminals; and a vending machine for verifying the terminal verification keys.

According to the present invention, because the vending machine system uses an existing portable radio-communication terminal such as a personal handy phone (hereinafter referred to as a PHS or a PHS terminal), the system eliminates troublesome operations, does not require a dedicated terminal and a cash card, and allows deferred payment. By means of the pseudo network for the radio-communication terminal for data communication, the verification key, which is assigned in a one to one correspondence to the terminal, is read by the vending machine by radio communication, and is recognized as personal data of the user. Because the PHS originally employs the improved cryptographic security, the invention is sufficient against leaking private information. The invention incorporates the general PHS as a part of the system, thereby reducing the costs and improving the reliability of the cashless vending machine system.

In another aspect of the invention, the cashless vending machine system comprises: a radio-communication terminal having a terminal information storage device for storing a verification key, and a terminal encryption processor for performing encryption with a random number and the terminal verification key; a vending machine having a radio-communication terminal pseudo network forming a pseudo network for the radio-communication terminal, and a verification key storage area for storing the terminal verification key from the radio-communication terminal, the radio-communication terminal pseudo network having a decryption processor for decrypting the terminal verification key from a value produced by the terminal encryption processor and a random number produced by a random number generator; and a center for communicating with the vending machine by radio or cable communication.

In another aspect of the invention, the vending machine refuses to sell an article when the terminal verification key is inappropriate.

The invention avoids illegal use of the PHS, e.g., rejects a person who stole the PHS tries to buy an article. To prohibit selling an article for some reason, the invention sets the terminal verification key of the radio-communication terminal to be inappropriate, so that the system stops selling an article to the person who actually carries the terminal when the terminal verification key corresponds to the inappropriate key.

BRIEF DESCRIPTION OF THE DRAWINGS

FIG. 5 is a flowchart showing the algorithm of the conventional vending machine system.

DETAILED DESCRIPTION OF THE INVENTION

The embodiment of the present invention will be explained with reference to the figures.

Figure 1:
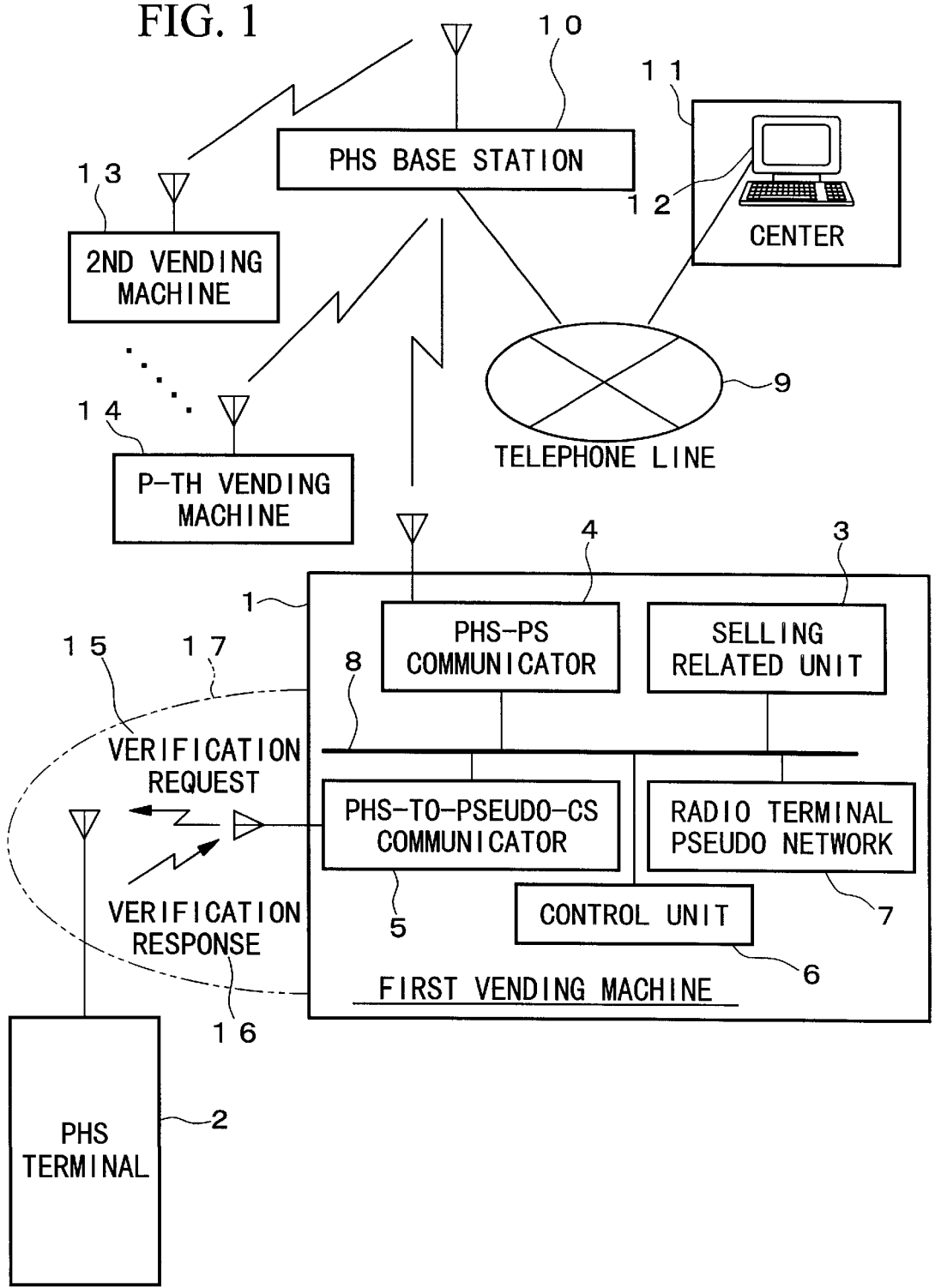
FIG. 1 is a block diagram showing the cashless vending machine system of the present invention.
Figure 2:
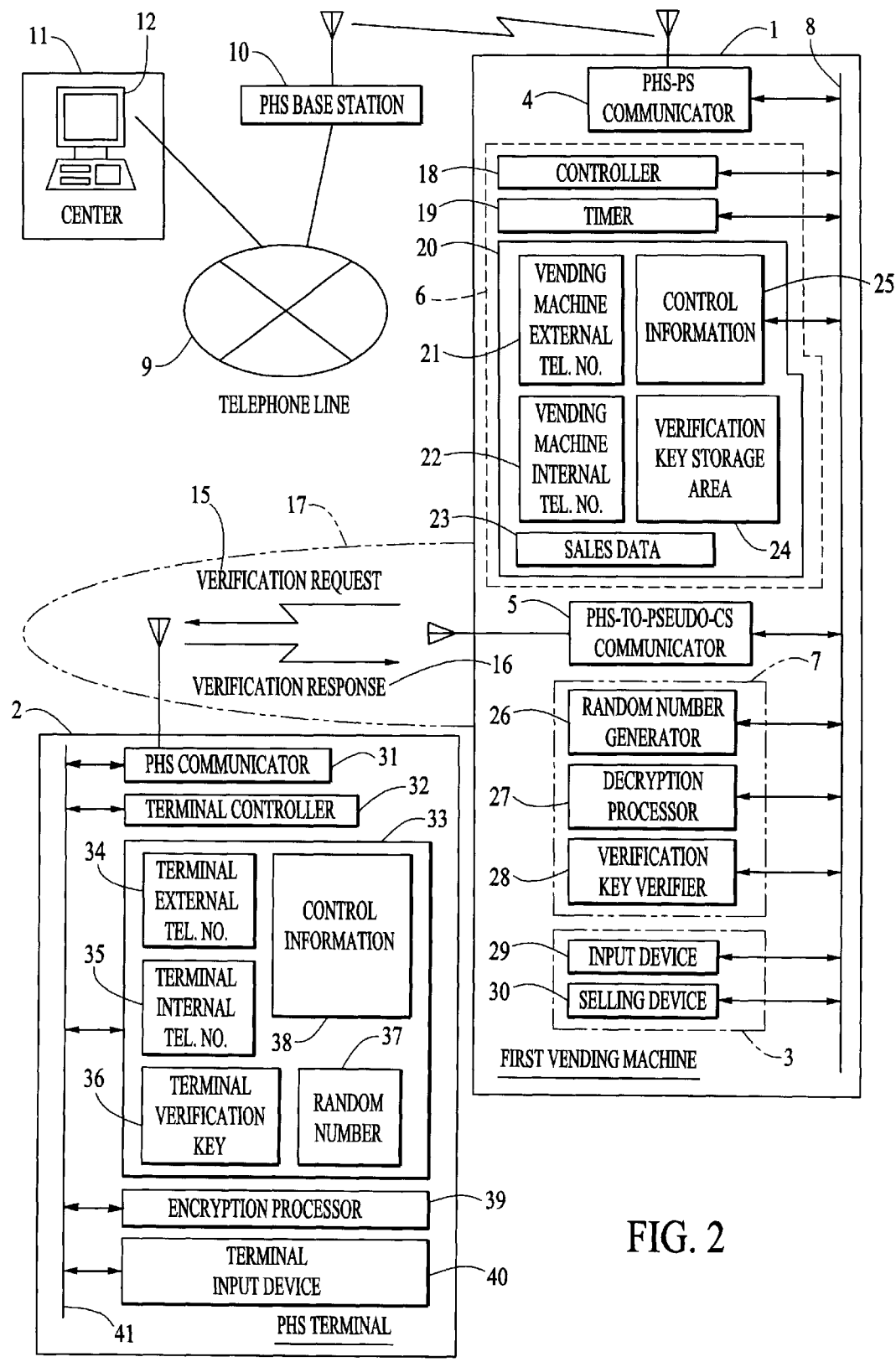
FIG. 2 is a block diagram showing the vending machine and the PHS terminal of FIG. 1 in more detail.

FIGS. 1 and 2 are block diagrams showing the embodiment. The cashless vending machine comprises a PHS terminal 2 which is a portable radio-communication terminal, a telephone line 9, a PHS base station 10, a center 11, a central management computer 12, a first vending machine 1, and a second- to P-th vending machines 13 to 14 (P is a positive integer equal to or above three).

The PHS terminal 2 is a general PHS terminal available on the market. As shown in FIG. 2, the PHS terminal 2 comprises: a PHS communicator 31 for sending and receiving information by PHS radio waves, a terminal controller 32 for controlling the operation of the PHS terminal 2, a terminal information storage unit 33 for storing information necessary for the operation of the PHS terminal 2, a terminal encryption processor 39 for encrypting two input values and outputting encrypted data, and a terminal internal bus 41 which is a line for electrically transmitting information. The terminal information storage unit 33 stores a terminal external telephone number 34 which is external number information for the PHS terminal 2, a terminal inward telephone number 35 which is inward number information for the PHS terminal 2, a terminal verification key 36 which is verification key information assigned uniquely to each PHS terminal, and a random number 37 which is input to PHS terminal 2 through the PHS communicator 31 in response to a verification request 15 from the first vending machine 1 requesting the verification key from the PHS terminal 2.

The first vending machine 1 comprises a PHS-PS communicator 4 for establishing radio communication with the PHS base station 10, a PHS-to-pseudo-CS (Cell Station) communicator 5 for establishing radio communication with the PHS terminal 2 within a vending machine surrounding area 17 around the first vending machine 1, a control unit 6 for controlling the first vending machine 1, a mobile radio-communication terminal pseudo network 7 for providing a pseudo network connecting the mobile radio-communication terminals (e.g., PHS terminals), a selling related unit 3 which contains various selling devices, and a vending machine internal bus 8 which is a line for transmitting electrical information.

The selling related unit 3 comprises an input device 29 for selecting a article which a buyer wishes to buy, and a selling device 30 for producing the article (e.g., preparing coffee) and transferring the product to a dispensing slot so that the buyer can receive it.

The control unit 6 comprises a controller 18 for controlling the operation of the first vending machine 1, a timer 19 for performing time management for the control of the first vending machine 1, and a vending machine information storage unit 20 for storing information necessary for the operation of the first vending machine 1. The vending machine information storage unit 20 stores a vending machine external telephone number 21 which is an external telephone information of the PHS-PS communicator 4, a vending machine inward telephone number 22 which is an inward telephone information of the PHS-PS communicator 4, selling data 23 which is selling information (e.g., sales, stock of articles, a change fund, and a trouble), a verification key storage area 24 for storing the verification key 36 received by the radio communication with the PHS terminal 2, and vending machine control information 25 which is control information for the entire first vending machine 1.

The mobile radio-communication terminal pseudo network 7 comprises a random number generator 26 for generating a random number, a decryption processor 27 for decrypting and outputting the terminal verification key 36 from the value which was produced by the terminal encryption processor 39 and was transmitted with the verification response 16 and from the random number produced by the random number generator 26, and a verification key verifier 28 for comparing the terminal verification key 36, output from the decryption processor 27, with a verification key for which purchase is not permitted (e.g., a verification key which is owned by a person who cannot pay because his or her account is overdrawn) and which is stored in the verification key storage area 24.

The second- to P-th vending machines 13 to 14 have the same structure as the first vending machine 1.

The operation of this embodiment will be explained with reference to FIGS. 2 and 3.

The PHS-to-pseudo-CS communicator 5 in the first vending machine 1 communicates only with the PHS terminal 2 within the area 17 surrounding the vending machine. Normally, the PHS terminal 2 regularly communicates with the PHS base station to register location information of the PHS terminal 2 to the PHS network and to the PHS terminal 2 via the PHS base station. The present invention provides the cashless vending machine system using the verification key 36 which is assigned to each PHS terminal 2 and was obtained by the above procedure for registration of the location information. Initially, the operation of obtaining the terminal verification key assigned to each PHS terminal is explained below.

Figure 3:
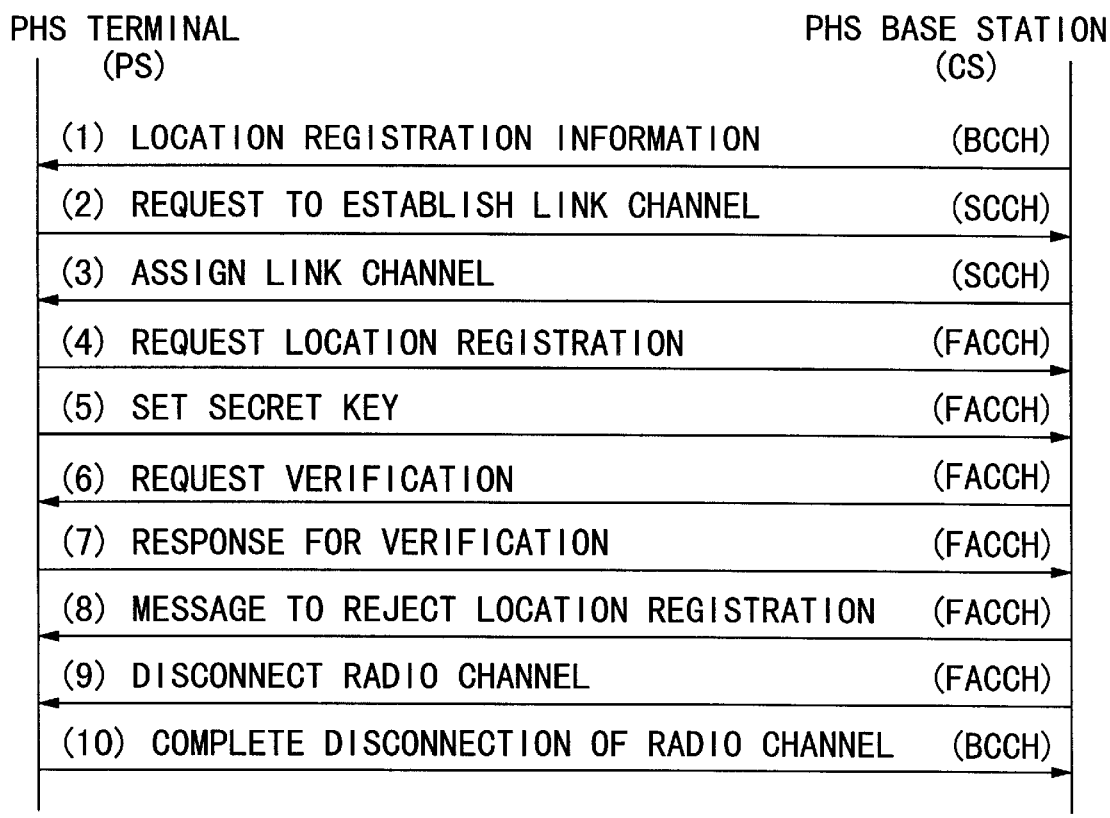
FIG. 3 is a diagram for explaining the operation of the cashless vending machine system of the present invention.
Figure 4:
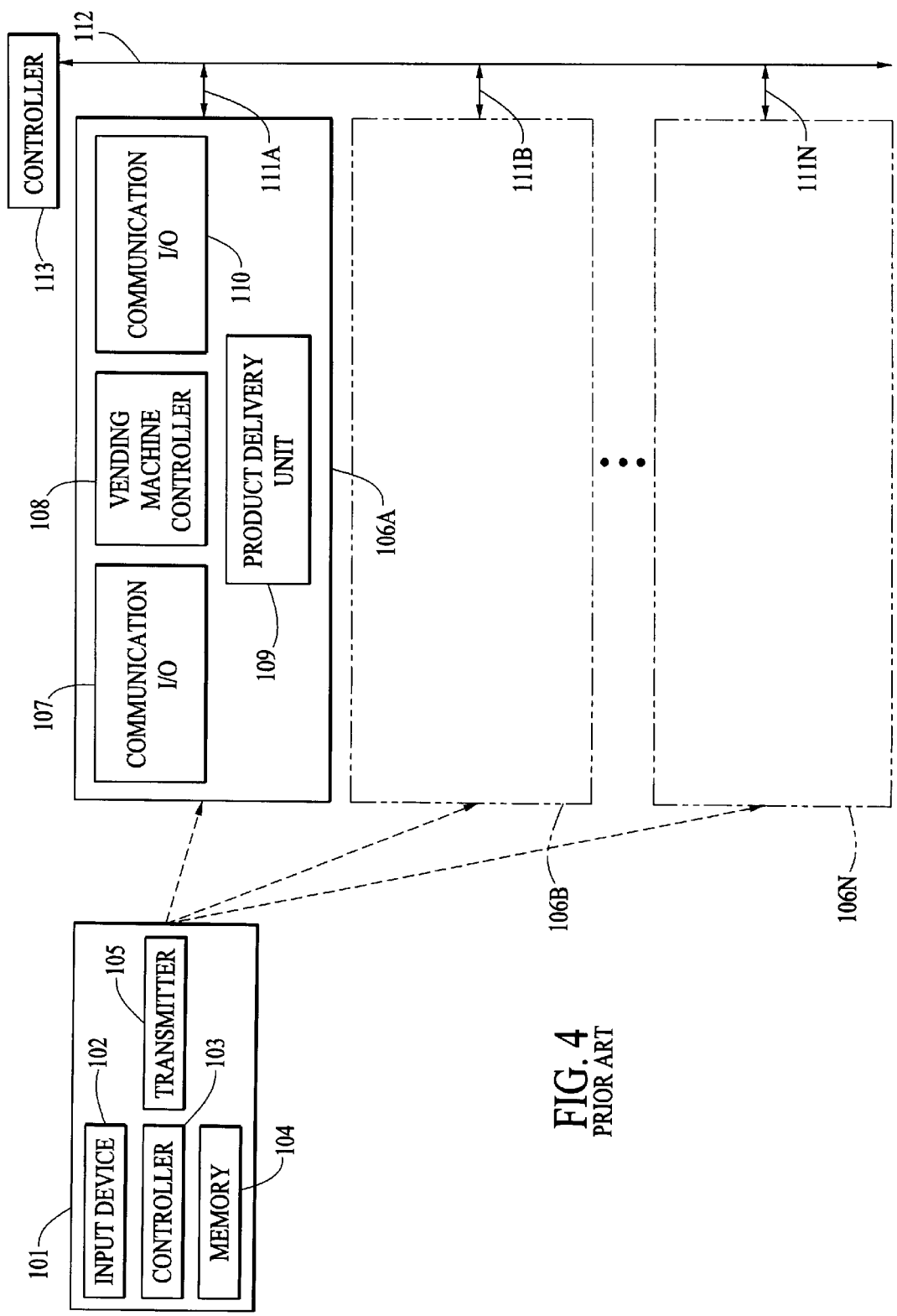
FIG. 4 is a block diagram showing a conventional vending machine system.

The process is initiated from phase (1) in FIG. 3. The PHS terminal 2 stores the location registration information indicating the PHS terminal 2 itself. The first vending machine 1 performs the location registration instead of the PHS base station. While the first vending machine 1 is operated by the controller 18 in the control unit 6, based on the vending machine control information 25 in the vending machine storage unit 20 which is sent via the vending machine internal bus 8, the explanation of this control sequence will be omitted. The first vending machine 1 sends a broadcast control channel (BCCH) at a regular interval, based on the information from the timer 19, via the PHS-to-pseudo-CS communicator 5 to the area 17 surrounding the vending machine. The BCCH differs from the location registration information from the true base station, and includes pseudo location registration information which does not exist. The first vending machine 1 sends the location registration information as a system information message with a general calling area number via the PHS-to-pseudo-CS communicator 5 to the PHS terminal 2 carried by a person who wishes to buy the article from the first vending machine 1 ("(1) location registration information" in FIG. 3). The PHS terminal 2 receives the system information message via the PHS communicator 31. Because the location registration information stored in the PHS terminal 2 always differs from the location registration information contained in the system information message, the terminal controller 32 sends a request for registration of the location from the PHS communicator 31 to the PHS-to-pseudo-CS communicator 5 by radio communication. While all operations of the PHS terminal 2 are controlled, based on the terminal control information 38 in the terminal information storage unit 33 which is obtained through the terminal internal bus 41, the explanation of this control sequence for the PHS terminal 2 will be omitted.

The process proceeds to phase (2) in FIG. 3. The PHS terminal 2 sends a request to establish a link channel to the PHS-to-pseudo-CS communicator 5, using a SCCH (Signaling Control Channel) ("(2) request to establish a link channel" in FIG. 3). Then, the process proceeds to phase (3) in FIG. 3. The PHS-pseudo-CS communicator 5 assigns the link channel by the SCCH to the PHS terminal 2 ("(3) assign link channel" in FIG. 3). The process proceeds to phase (4), where the PHS terminal 2 sends a request for registration of the location to the mobile radio-communication terminal pseudo network 7 by the radio communication between the PHS communicator 31 to the PHS-to-pseudo-CS communicator 5 ("(4) request location registration" in FIG. 3).

Then, the process proceeds to phase (5) in FIG. 3. The PHS terminal 2 sends a secret key setting message to inform the PHS-to-pseudo-CS communicator 5 of its secret key ("(5) set secret key" in FIG. 3). The process proceeds to phase (6), where the random number generator 26 in the mobile radio-communication terminal pseudo network 7 generates a random number, and sends the random number to the PHS terminal with a request message for verification which is a verification request 15 ("(6) request verification" in FIG. 3). Then, the process proceeds to phase (7), where, on reception of the verification request message, the PHS terminal 2 stores the random number 37 in the terminal storage unit 33. The terminal encryption processor 39 in the PHS terminal 2 encrypts the random number 37 using the terminal verification key 36, and the PHS terminal 2 sends the result of this verification process with a verification response message as a verification response 16 to the PHS-to-pseudo-CS communicator 5 ("(7) response for verification" in FIG. 3).

Then, the process proceeds to phase (8) in FIG. 3. On reception of the verification response message, the PHS-to-pseudo-CS communicator 5 supplies the encryption result with the terminal verification key 36, which is contained in the verification response message, to the processor 27. The decryption processor 27 receives the random number, which was produced in the random number generator 26, and the encryption result, which includes the terminal verification key 36 of the verification response message, and outputs the decrypted terminal verification key 36. Normally, the PHS network compares the verification key in the PHS network with the terminal verification key 36 sent from the PHS terminal 2. When the keys are different, the PHS network returns a location registration rejection message to the PHS terminal 2. When the keys are identical, the location registration process is performed, and a location registration acceptance message is sent to the PHS terminal 2. However, because the location registration information from the first vending machine 1 is pseudo information, that is, not true information, the PHS-to-pseudo-CS communicator 5 always returns the location registration rejection message to the PHS terminal 2. The location registration rejection message prevents the PHS terminal 2 from registering the pseudo location registration information ("(8) message to reject location registration" in FIG. 3).

The process proceeds to phase (9) in FIG. 3. After returning the location registration rejection message to the PHS terminal 2, the PHS-to-pseudo-CS communicator 5 instructs disconnection of the radio channel ("(9) disconnect radio channel" in FIG. 3). Then, the process proceeds to phase (10) in FIG. 3. The PHS terminal 2 disconnects the radio channel ("(10) complete disconnection radio channel" in FIG. 3).

As described above, the first vending machine 1 obtains the terminal verification key 36 of the PHS terminal 2 which is carried by the user who wishes to buy the article on sale. In general, the PHS terminal 2 has the terminal external telephone number 34, which is used for radio external communication (radio external call), and the terminal internal telephone number 35, which is used for radio internal communication (radio internal call). In general, the user of the PHS terminal 2 pushes buttons with printed numbers provided on the terminal input device 40 to input the telephone number of the person whom the user wishes to speak to.

The operation of the cashless vending machine using the terminal verification key 36 will be explained with reference to FIGS. 1 and 2.

The lost or stolen terminal verification keys (hereinafter referred to as "inappropriate terminal verification key") are managed by and are stored in the central management computer 12. The first vending machine 1 communicates with the central management computer 12 in the center 11 via the PHS-PS (Personal Station) communicator 4, the PHS base station 10, and the telephone line 9 at a regular interval set by the timer 19, to obtain the inappropriate terminal verification keys, and stores them in the verification storage area 24 via the vending machine internal bus 8.

When the user, who wishes to buy the article on sale from the first vending machine 1 and carries the PHS terminal 2, enters the area 17 surrounding the vending machine 1, the first vending machine 1 obtains the terminal verification key 36 of the PHS terminal 2 through the radio communication according to the sequence described above. The obtained terminal verification key 36 is sent through the vending machine internal bus 8 and is stored in the verification key storage area 24 in the vending machine information storage unit 20. Based on the vending machine control information 25, the controller 18 directs the verification key verifier 25 to compare the terminal verification key 36, stored in the verification key storage area 24, with the inappropriate terminal verification keys. When the terminal verification key is inappropriate, the vending machine 1 rejects the user who carries the PHS terminal 2 with the inappropriate terminal verification key, and, for example, provide a warning by producing an alarm call for a predetermined time.

As the result of the verification, when the terminal verification key 36 is appropriate, the vending machine permits the user, who carries the PHS terminal 2 with the appropriate verification key, to buy the article from the vending machine. The permitted user pushes one of the buttons of the vending machine input device 29 on which the article names are printed. The selling device 30 delivers the article corresponding to the pushed button to the user. Simultaneously, the first vending machine 1 stores the selling price as the selling data 23, and stores the terminal verification key 36 of the user's PHS terminal in the verification key storage area 24, associating them with each other.

Then, the first vending machine 1 communicates with the PHS base station via the PHS-PS communicator 4 by the vending machine external telephone number 21 at a regular interval, which is set in the timer 19. e.g., every month in a manner similar to an automatic transfer service account. This communication allows the central management computer 12 to obtain and store the sales data 23 from the first vending machine 1, and the terminal verification key 36, associated with the sales data, of the user in the area 24 surrounding the first vending machine. The central management computer 12 automatically draws the amount from the account of the user, based on the sales data 23 and the terminal verification key 36.

The information contained in the selling data 23 in the first vending machine 1, e.g., the sales data is regularly reported to the central management computer 12 through the PHS-PS communicator 4 by the vending machine external telephone line 21. The stock of articles and the change fund are also reported to the central management computer 12 when the stock decreases below a predetermined amount. The data of trouble is reported as an alarm to the central management computer 12 when trouble occurs. Based on the content of the alarm, an operator appropriately copes with the trouble in the vending machine.

As described above, the cashless vending machine system eliminates operations of, e.g., inputting the number through the terminal input device, which is troublesome for a user, and allows deferred payment.

While the embodiment uses the location registration sequence to obtain the terminal verification key of the PHS terminal, the other control sequence with verification phases of the verification request and response, e.g., the control sequence for hand-over may be utilized.

The present invention is not limited to this, and may be applied to other systems using radio communication such as a cellular telephone instead of the PHS terminal.

While in the embodiment the vending machine communicates with the central management computer by the radio communication through the PHS base station, this invention can be applied to a vending machine system in which a number of vending machines in a predetermined area transmit information via one of the vending machines to the central management computer by radio internal communication using the vending machine internal telephone number 22 of FIG. 2. This system does not use the external communication through the telephone line, thereby reducing the costs for construction of the cashless vending machine system.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A cashless vending machine for use with at least one radio-communication terminal comprising:

(a) a radio-communication terminal pseudo-network forming a pseudo-network for said at least one radio-communication terminal;

(b) a terminal verification key storage area for storing a plurality of reference terminal verification keys;

(c) a receiver for receiving a terminal verification key from said at least one radio-communication terminal;

(d) a decryption module for decrypting a terminal verification key received from said at least one radio-communication terminal;

(e) a verification device for comparing said decrypted terminal verification key from said at least one radio-communication terminal with said stored plurality of reference terminal verification keys;

(f) a vending mechanism for vending an item upon verification of said decrypted terminal verification key; and (g) a communicator for establishing communication between said cashless vending machine and a management center.

2. The cashless vending machine as recited in claim 1 further comprising:

(a) a random number generator for generating a random number; and (b) a transmitter for transmitting said random number to said at least one radio-communication terminal, said random number used by said at least one radio-communication terminal to encrypt said terminal verification key.

3. The cashless vending machine as recited in claim 2 wherein said transmitter transmits a broadcast system information message which includes pseudo-location registration information, said pseudo-location registration information differing from location registration information stored in said at least one radio-communication terminal.

* * * * *